US009439513B2

(12) United States Patent
Walser

(10) Patent No.: US 9,439,513 B2
(45) Date of Patent: Sep. 13, 2016

(54) SPRING-SOFT INTERMEDIATE MOUNTING PIECE FOR SWIVEL CHAIRS

(75) Inventor: Thomas Walser, Kreuzlingen (CH)

(73) Assignee: Inventor Group GmbH, Wollerau (CH)

( * ) Notice: Subject to any disclaimer, the term of this patent is extended or adjusted under 35 U.S.C. 154(b) by 0 days.

(21) Appl. No.: 13/125,206

(22) PCT Filed: Oct. 22, 2009

(86) PCT No.: PCT/EP2009/063915
§ 371 (c)(1),
(2), (4) Date: Jul. 13, 2011

(87) PCT Pub. No.: WO2010/046447
PCT Pub. Date: Apr. 29, 2010

(65) Prior Publication Data
US 2011/0272994 A1 Nov. 10, 2011

(30) Foreign Application Priority Data

Oct. 22, 2008 (DE) .................... 20 2008 014 043 U

(51) Int. Cl.
| F16M 1/00 | (2006.01) |
| A47C 7/00 | (2006.01) |
| A47C 3/026 | (2006.01) |
| A47C 7/44 | (2006.01) |
| A47C 1/00 | (2006.01) |
| B60S 1/04 | (2006.01) |

(52) U.S. Cl.
CPC ............... *A47C 7/004* (2013.01); *A47C 3/026* (2013.01); *A47C 7/448* (2013.01); *B60S 1/0444* (2013.01); *B60S 1/0438* (2013.01); *B60S 1/0447* (2013.01)

(58) Field of Classification Search
CPC ......................................................... A47C 3/30
USPC ..................... 267/131, 140.2, 141, 153, 220, 267/293–295; 297/344.21, 344.19
See application file for complete search history.

(56) References Cited

U.S. PATENT DOCUMENTS

| 2,048,148 | A | * | 7/1936 | Stoll | ............................ 248/583 |
| 2,179,959 | A | * | 11/1939 | Schroedter | .................... 403/224 |
| 2,273,869 | A | * | 2/1942 | Julien | .......................... 267/153 |

(Continued)

FOREIGN PATENT DOCUMENTS

| DE | 93 05 912 U1 | 8/1993 |
| DE | 201 07 268 U1 | 7/2001 |

(Continued)

*Primary Examiner* — Robert A Siconolfi
*Assistant Examiner* — Mahbubur Rashid
(74) *Attorney, Agent, or Firm* — Browdy and Neimark, PLLC

(57) ABSTRACT

Spring-soft intermediate mounting piece for use in a swivel chair, which comprises a chair column comprising a gas lift (1) and a standardized cone, as well as a seat mechanism comprising a conical sleeve, wherein the intermediate mounting piece comprises an elastic element so as to enable a spring-soft interconnection between the chair column and the seat mechanism. The intermediate mounting piece comprises a cartridge (3) for being able to receive the standardized cone of the chair column (9), wherein the cartridge (3) is at least partially encased by an elastic rubber element (7). In addition, the intermediate mounting piece, which comprises in an upper portion thereof a housing comprising a cone (4) for plugging the cartridge (3) of the seat mechanism and which encloses in a lower portion thereof the cartridge (3) together with the elastic rubber element (7) at least partially in the radial direction.

5 Claims, 4 Drawing Sheets

(56) References Cited

U.S. PATENT DOCUMENTS

| | | | |
|---|---|---|---|
| 3,672,721 A * | 6/1972 | Williams | 297/303.1 |
| 4,328,943 A * | 5/1982 | Eldon, III | 248/578 |
| 4,580,749 A * | 4/1986 | Howard | 248/161 |
| 4,595,237 A * | 6/1986 | Nelsen | 297/344.19 |
| 4,756,496 A * | 7/1988 | Hosan et al. | 248/161 |
| 4,779,925 A * | 10/1988 | Heinzel | 297/300.4 |
| 4,807,841 A * | 2/1989 | Edstrom | 248/580 |
| 5,012,996 A * | 5/1991 | Poertzgen et al. | 248/161 |
| 5,044,587 A * | 9/1991 | Degen | 248/158 |
| 5,284,312 A * | 2/1994 | Dony | 248/161 |
| 5,740,997 A * | 4/1998 | Van Wieran | 248/404 |
| 6,022,077 A * | 2/2000 | Kirkland et al. | 297/344.19 |
| 6,279,864 B1 * | 8/2001 | Carnahan et al. | 248/418 |
| 6,830,492 B1 * | 12/2004 | Magee et al. | 440/61 R |
| 7,108,253 B2 * | 9/2006 | Venton-Walters et al. | 267/220 |
| 2002/0043846 A1 * | 4/2002 | Brauning | 297/314 |
| 2005/0224742 A1 * | 10/2005 | Seong | 251/231 |
| 2006/0214489 A1 * | 9/2006 | Cheng | 297/344.12 |

FOREIGN PATENT DOCUMENTS

| | | |
|---|---|---|
| EP | 0761136 A1 | 3/1997 |
| GB | 961345 A | 6/1964 |

* cited by examiner

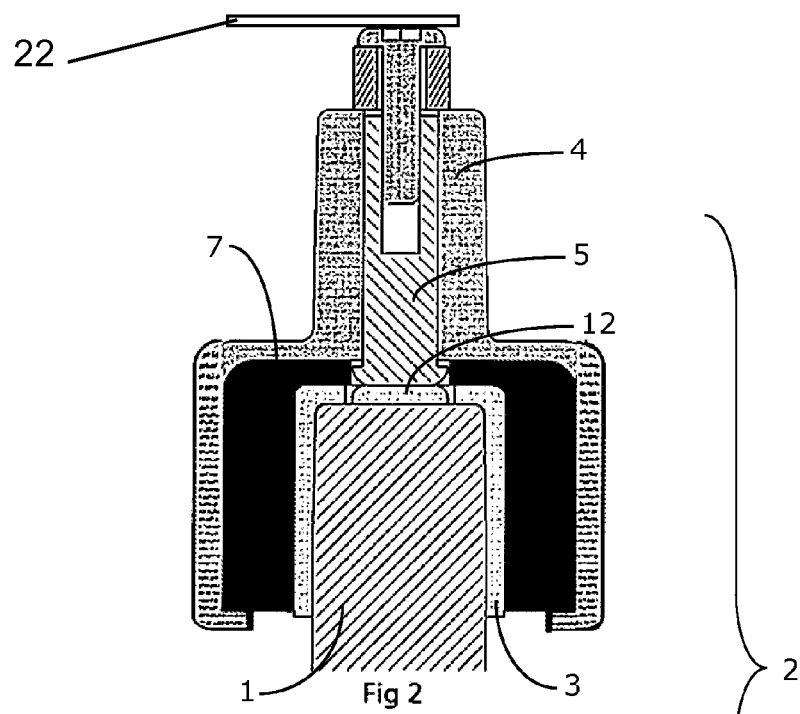
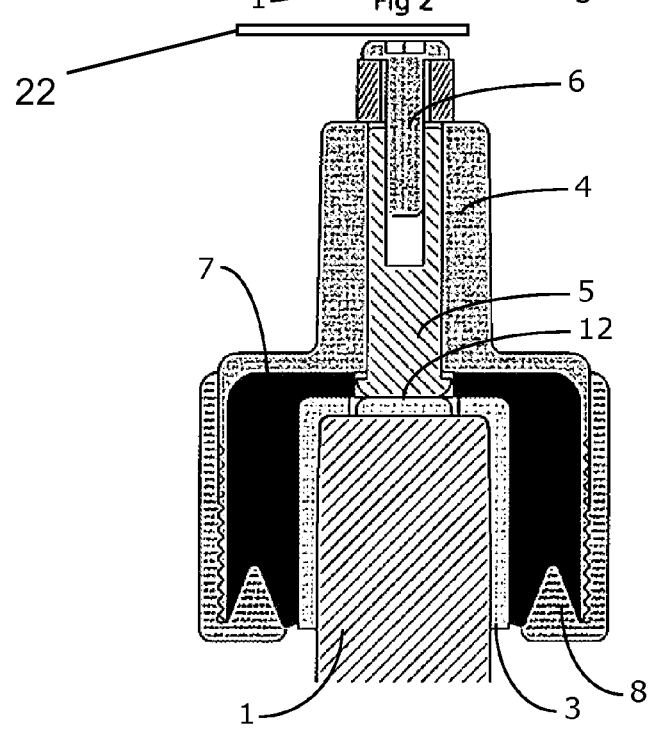

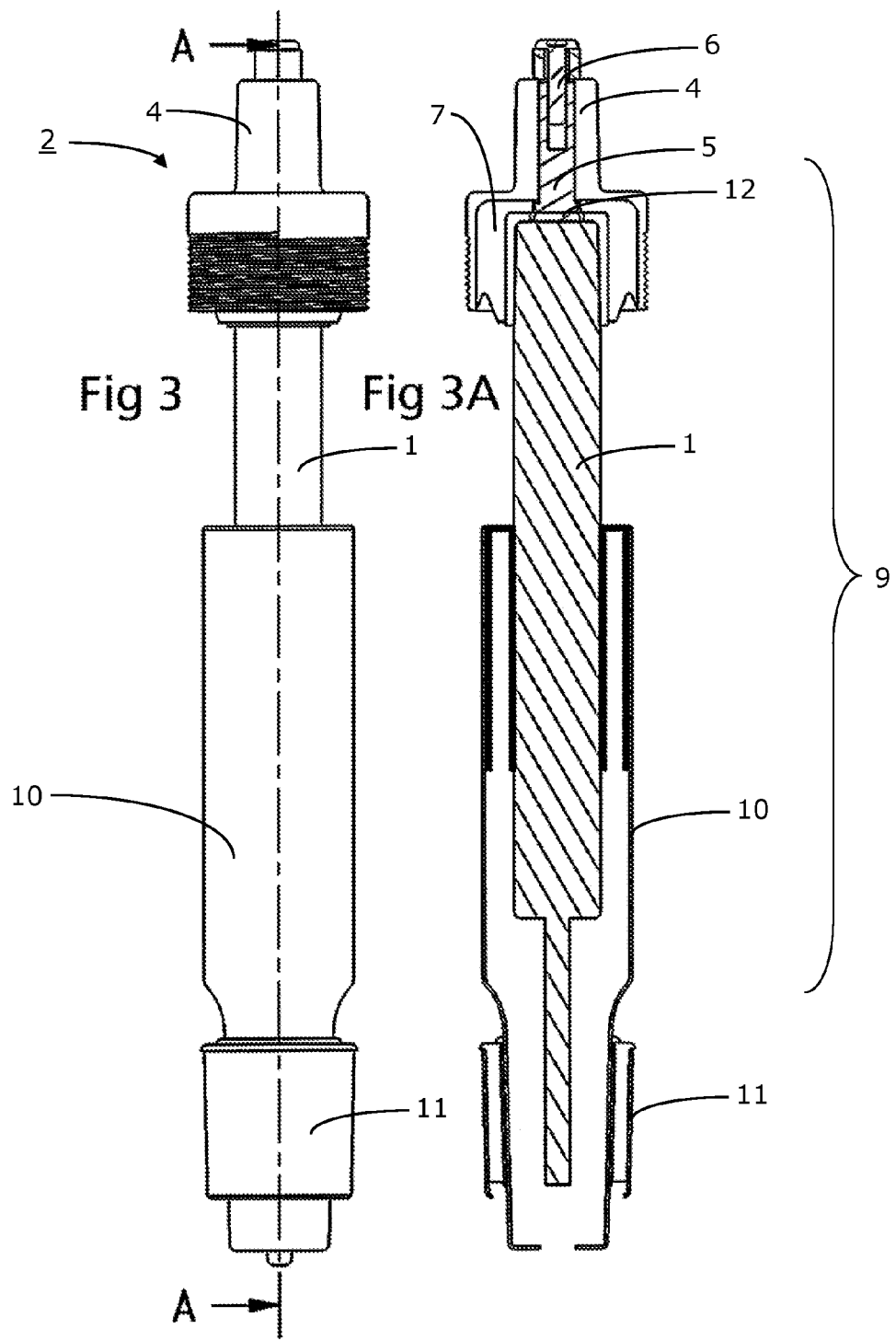

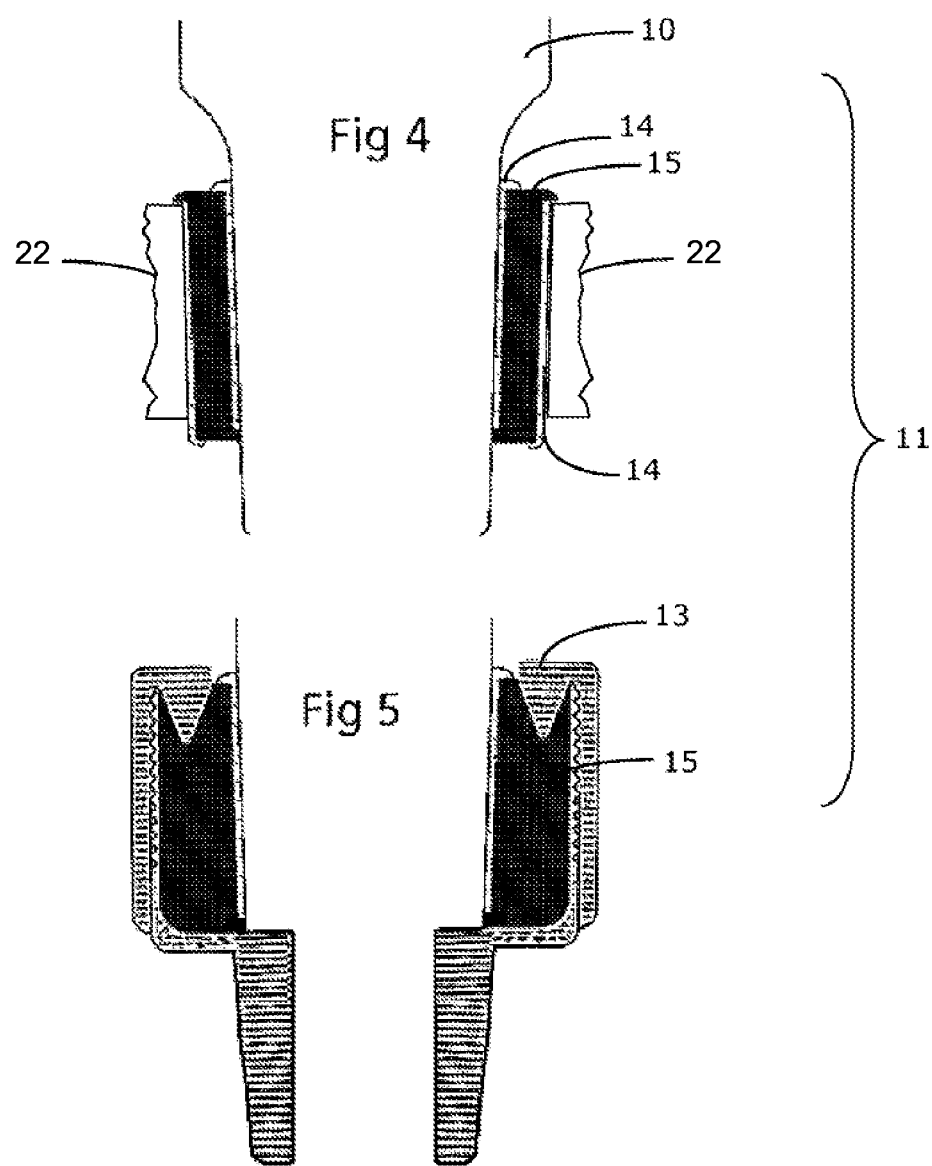

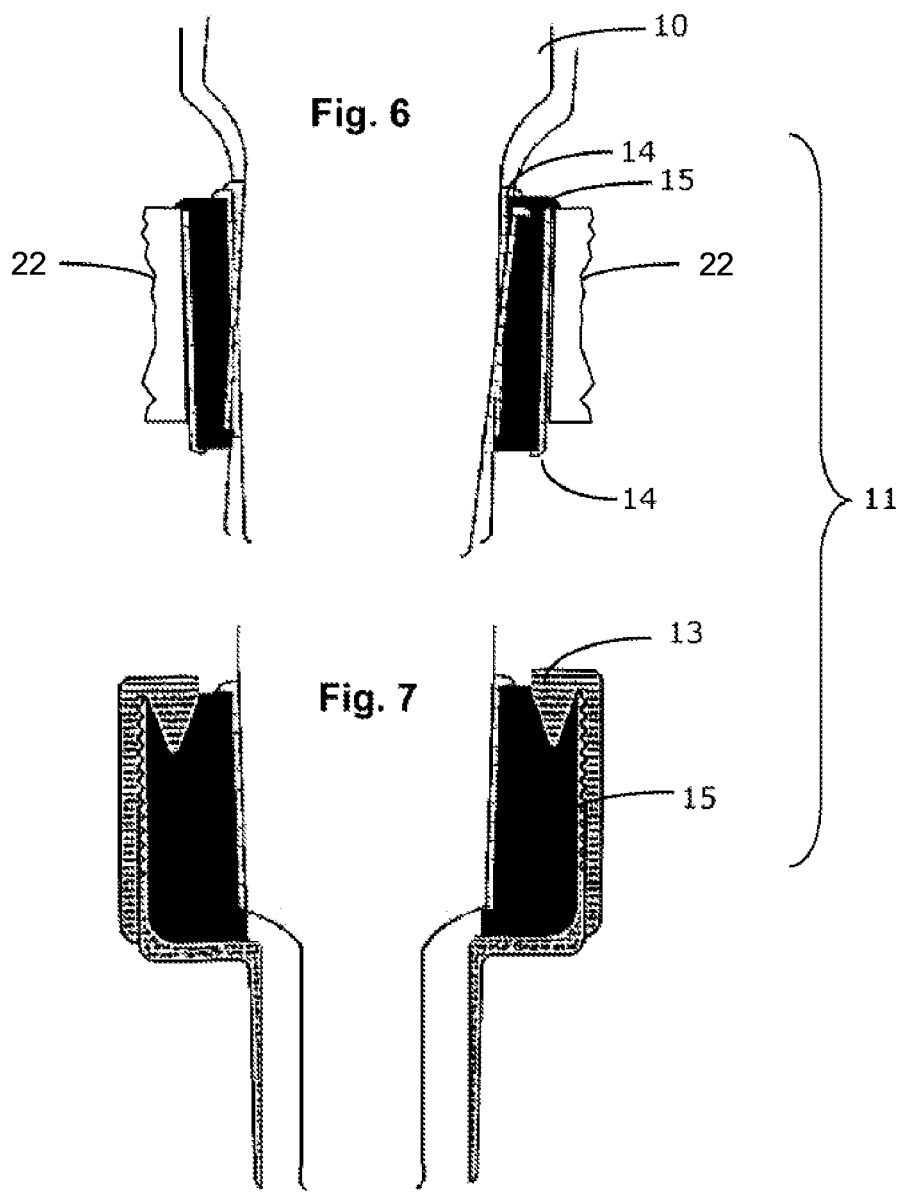

SPRING-SOFT INTERMEDIATE MOUNTING PIECE FOR SWIVEL CHAIRS

The invention relates to spring-soft intermediate mounting pieces, which are movable spring-softly towards all sides.

DESCRIPTION

The priority is claimed of German utility model DE 20 2008 014 043.9, which has been filed on 22 Oct. 2008.

The conventional chair stands are equipped with a stable static undercarriage. It is also known that the movability, which is ever commonly desired for ergonomic reasons, is integrated in the stand, in the column or in the seat mechanics. This requires respective complex adaptations of the component parts.

From document EP 0 761 136 B1, seating furnitures are known which are cushioned in a vertical direction.

It is an object of the invention to insert an additional versatile intermediate piece between the usual existing components without any adaptations to the respective component part and to thereby achieve an additional value for the existing immovable components.

The invention is described in the following with reference to embodiments represented in the drawings. It shows FIG. 1 a schematic view of a gas lift comprising an intermediate piece at the top;

FIG. 2 a schematic view of a gas lift comprising an intermediate piece at the top;

FIG. 3 a schematic view of a gas lift comprising two intermediate pieces at the top and at the bottom;

FIG. 3A a schematic cross-sectional view of FIG. 3;

FIG. 4 a schematic detailed view of an intermediate piece at the bottom;

FIG. 5 a schematic detailed view of an intermediate piece at the bottom;

FIG. 6 a schematic detailed view of an intermediate piece at the bottom;

FIG. 7 a schematic detailed view of an intermediate piece at the bottom.

This is achieved by the following provisions:

It is known that world-wide practically all height adjustable gas lifts 1 for chair columns have a standardized dimension of 28 mm comprising a Morse cone (approximately 1.44° conically). The standpipes 50 mm comprising a Morse cone 1.44° are also standardized.

Usually in swivel chairs under the seat base, the seat mechanics comprising an integrated mechanism, which has at its bottom side a fitting conical sleeve (not shown) is plugged onto this Morse cone. As soon as this connection is loaded, there results a stable permanent press-fitting. In the standpipes, the Morse cone is usually arranged at the bottom side. This cone is plugged into the respective fitting opening of the star base/disks. The base link may also be realized in the design shown.

Between the Morse cone of the gas lift 1 and the conical sleeve (not shown) of the seat mechanics, an intermediate piece 2 is plugged (in series), which piece has at its bottom a fitting cartridge 3 for receiving the gas lift 1 and at its top a fitting cone 4 for plugging thereon the mentioned conical sleeve of the seat mechanics. The intermediate piece 2 is herein also referred to as mounting intermediate piece 2. The seat mechanic usually comprises a release lever 22, which presses on a release knob 12 of the gas lift 1 in the centre of a conical supporting ring and thus adjusts the seat height.

The distance between this release lever and the release knob 12 is bridged by a tappet 5, which has integrated an adjustment screw 6 for finely adjusting resp. tweaking the release distance.

The movability of the intermediate part 2 and thus of the whole upper portion of the chair is achieved by a vulcanized-in, pre-loaded rubber part 7, the hardness of which amounts preferably to 60-90 Shore and particularly preferably 60-75 Shore.

The intermediate piece 2 shown in FIG. 2 has the same function as the intermediate piece 2 shown in FIG. 1, however the ability to vibrate sidewardly is provided using a confinement by means of a wedge 8 turned into the cylinder, as shown in FIG. 2. The wedge 8 effects on one hand side a direct mechanical reduction of the possibilities to move of the rubber part 7 and on the other hand side the possibility to give way of the bulk of the rubber of the rubber part 7 is increasingly reduced in the outward direction and thus in addition the rubber part 7 is made adjustable to harden by the wedge 8.

In FIG. 3 and in the respective cross-sectional representation shown in FIG. 3A, the two component parts 2 and 11, which are tucked preferably in combination way but also individually onto the chair column 9 (intermediate part 2) and under the chair column 9 (component part 11), are exhibited as a whole as an assembly group. A pivoting from the bottom side produces an inclination of the seat base, which may be compensated in turn by the upper movable intermediate piece 2 which is "switched" therebetween. A chair column 9 comprising the gas lift 1 and the standpipe 10 is arranged therebetween.

The lower movable plug part 11 alone, or in combination with the upper movable intermediate part 2, is particularly suited for a seating without rolling.

FIG. 4 is a detailed view of the plug connector 11 (also referred to as movable lower plug connector part 11), which is arranged between the usually conical bottom side of the standpipe 10 of the chair column 9 and the conical opening of the star base 12.

This conical opening is world-wide dimensioned normally 50 mm at the top side of the star base and also tapers in the downward direction with approximately 1.4°.

In a few cases, there are also smaller conical standpipes 10 for swivel chairs. The smallest dimension must be chosen such that the standardized gas lift 1 (28 mm) can slide on the inner side of the standpipe 10 down to the lower limit so that the maximum adjustability in the downward direction persists maintained.

Two thin tubular jackets 14 are arranged between the standpipe 10 and the star base 22 or a base plate or a base disk. The void therebetween is vulcanized with a pre-stressed rubber part 15.

When subjected to pressure from the top side, the conical shape between the tubular jackets 14 contributes to an increased pre-stress of the rubber part 15. The hardness of the rubber part 15 is between 50 and 80 Shore. (The thinner the rubber part 15, the softer the rubber part 15 may be because the pressure behaviour varies with the narrow sideward "escape routes").

The assembly group shown in FIG. 5 has the same function as that in FIG. 4, however similar to FIG. 2, the sideward deflection is adjustable by the rotatable cylindrical wedge 13 which penetrates into the rubber part 15, wherein the arrangement has simply been turned upside down.

Further details of the embodiments according to FIGS. 4 and 5 are shown in FIGS. 6 and 7.

In particular for leaning aids, if a greater sideward deflection is desired, then in the embodiment shown the cone is arranged below or above the soft part for taking up the force in the chair base.

The invention claimed is:

1. A spring-soft mounting intermediate piece for use in a swivel chair comprising a chair column comprising a gas lift, a cone and a seat mechanism comprising a conical sleeve plugged onto the cone, a release lever acting indirectly with the gas lift via a release knob of the gas lift,
   wherein the mounting intermediate piece is configured to be plugged in between the gas lift and the conical sleeve so as to be arranged in series with the gas lift and the conical sleeve,
   wherein the mounting intermediate piece comprises:
   an elastic rubber element to ensure a spring-soft interconnection between the chair column and the seat by means of the mounting intermediate piece, the elastic rubber element having a cup shape with a floor and an annular side wall extending longitudinally from the floor, the elastic rubber element having an opening defined in the floor,
   a housing which comprises an upper portion and a lower portion, the upper portion having a smaller diameter than a
   diameter of the lower portion, the upper portion comprising a fitting cone for fitting into the conical sleeve of the seat mechanism of the chair, the housing and the fitting cone being one piece,
   a fitting cartridge disposed in the lower portion of the housing, the fitting cartridge having a cup shape with a floor and an annular side wall extending longitudinally from the floor, the fitting cartridge having an opening defined in the floor, the elastic rubber element being situated between and in direct contact with both the housing and an outer surface of the fitting cartridge, the fitting cartridge receiving at least a portion of the gas lift such that an inner surface of the fitting cartridge is in direct contact with the gas lift, and the fitting cartridge being at least partially enclosed by the elastic rubber element, an inner surface of the floor of the fitting cartridge engaging an upper surface of the gas lift, an inner surface of the floor of the elastic rubber element engaging an outer surface of the floor of the fitting element, wherein the floor of the elastic rubber element is sandwiched between the floor of the fitting cartridge and the fitting cone of the housing, the fitting cartridge and the elastic rubber element having a cylindrical shape, with straight annular side walls, and
   a tappet for connecting the release lever to the release knob, the tappet being inserted through the opening defined in the floor of the elastic element so that an inner surface of the floor is in direct contact with the fitting cartridge,
   wherein the release lever is a part of the seat mechanism and the release lever presses on the release knob of the gas lift to adjust height of the seat via the tappet, and
   wherein the tappet is arranged in the fitting cone and extends through the fitting cartridge to the release knob of the gas lift.

2. A spring-soft mounting intermediate according claim 1, wherein the tappet has integrated an adjustment screw for adjusting the release distance between the tappet and the seat mechanism to adjust the height of the seat, the adjustment screw connecting the tappet to the release lever.

3. The spring-soft mounting intermediate piece according to claim 1, wherein the mounting intermediate piece is dimensioned so that the mounting intermediate piece can be plugged onto and used with a majority of the existing cones of gas lifts provided at chair columns and seat base mechanisms without any adaptation therebetween.

4. A spring-soft mounting intermediate according claim 1, wherein the housing comprises:
   a top to which the seat mechanism is to be connected,
   an annular side wall extending longitudinally from the top, and
   an annular flange extending radially inwardly from said annular side wall,
   the annular flange further comprising a wedge extending longitudinally towards the top of the housing, and
   wherein said rubber element completely fills a space formed by the housing and the cartridge when the intermediate piece is in use, and
   wherein in use, the gas lift can vibrate sideways within the housing as limited by the rubber element and the wedge.

5. A spring-soft mounting intermediate piece for use in swivel chairs, comprising:
   a first tubular jacket,
   a second tubular jacket fits over the first tubular jacket and spaced from the first tubular jacket forming a space therebetween,
   a conical cylinder on one side of the intermediate piece,
   a conical opening on another side of the intermediate piece,
   the intermediate piece being configured to be mounted as a custom-fit piece accurately fitting to fit between assembly groups of a swivel chair, said existing assembly group comprising a chair column with a gas lift and a cone, a seat mechanism comprising a conical sleeve which is designed for being plugged onto the cone, a release lever acting indirectly with the gas lift via a release knob, the first tubular jacket configured so as to receive the chair column,
   the intermediate piece further comprising:
   a rubber element fit in a space between the first and second tubular jackets so as to completely fill the space, the rubber element having a cup shape with a floor and an annular side wall extending longitudinally from the floor, the elastic rubber element having an opening defined in the floor, and
   a housing which comprises an upper portion and a lower portion, the upper portion having a smaller diameter than a diameter of the lower portion, the upper portion comprising a fitting cone for fitting into the conical sleeve of the seat mechanism of the chair, the housing and the fitting cone being one piece,
   a fitting cartridge disposed in the lower portion of the housing, the fitting cartridge having a cup shape with a floor and an annular side wall extending longitudinally from the floor, the fitting cartridge having an opening defined in the floor, the elastic rubber element being situated between and in direct contact with both the housing and an outer surface of the fitting cartridge, the fitting cartridge receiving at least a portion of the gas lift such that an inner surface of the fitting cartridge is in direct contact with the gas lift, and the fitting cartridge being at least partially enclosed by the elastic rubber element, an inner surface of the floor of the fitting cartridge engaging an upper surface of the gas lift, an inner surface of the floor of the elastic rubber element engaging an outer surface of the floor of the fitting element, wherein the floor of the elastic rubber element is sandwiched between the floor of the fitting cartridge and the fitting cone of the housing, the fitting cartridge and the elastic rubber element having a cylindrical shape, with straight annular side walls, and
a tappet for connecting between the release lever and the release knob, the tappet being inserted through the opening defined in the floor of the elastic element so that an inner surface of the floor is in direct contact with the fitting cartridge, wherein the release lever is a part of the seat mechanism and the release lever presses on the release knob of the gas lift to adjust height of the seat via the tappet, and the tappet is arranged in the fitting cone and extends through the fitting cartridge to the release knob of the gas lift.

* * * * *